Oct. 16, 1962 J. H. POMERENE 3,058,656
ASYNCHRONOUS ADD-SUBTRACT SYSTEM
Filed Dec. 29, 1958 4 Sheets-Sheet 3
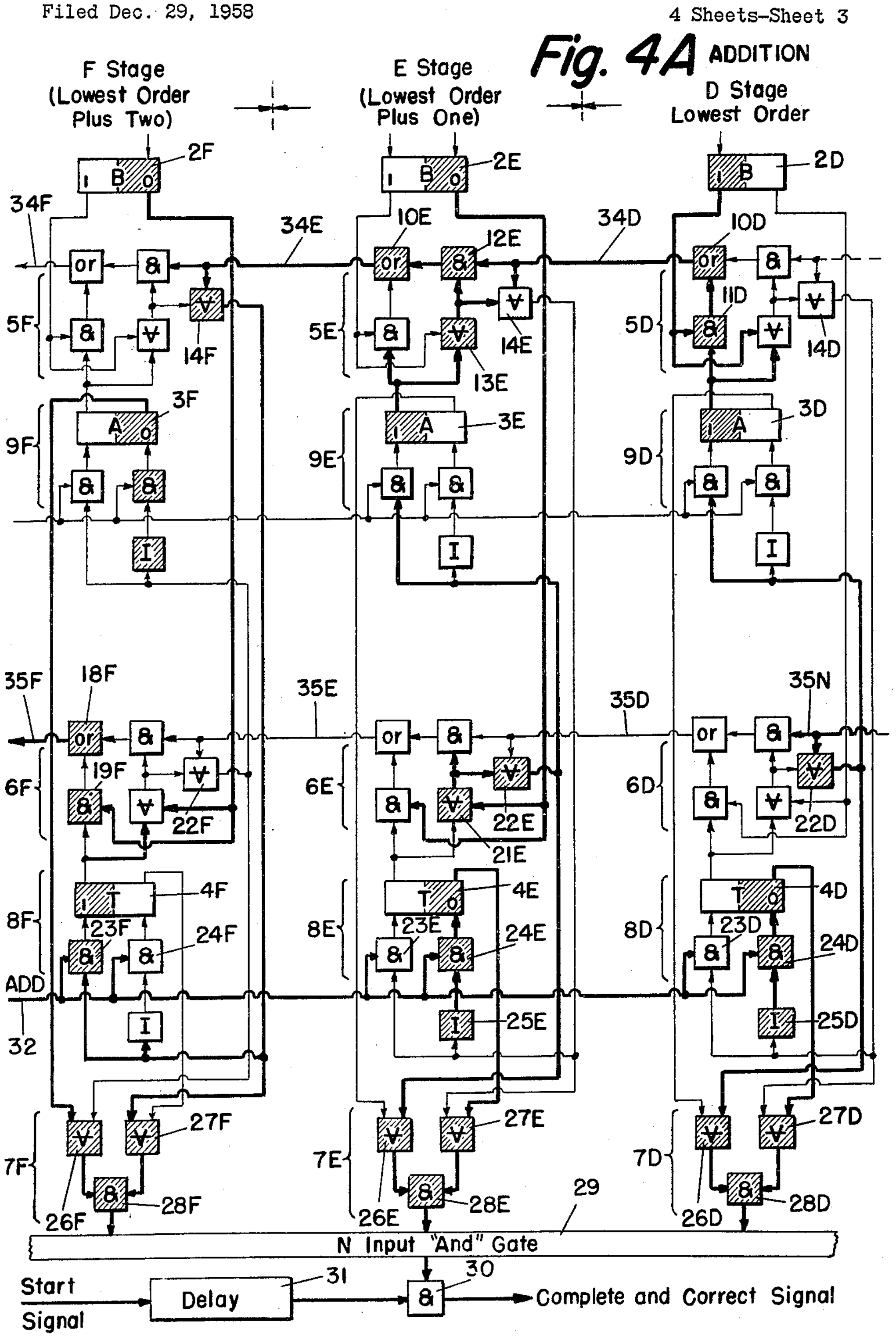
Fig. 4A ADDITION

United States Patent Office 3,058,656

Patented Oct. 16, 1962

3,058,656

ASYNCHRONOUS ADD-SUBTRACT SYSTEM

James H. Pomerene, Poughkeepsie, N.Y., assignor to International Business Machines Corporation, New York, N.Y., a corporation of New York Filed Dec. 29, 1958, Ser. No. 783,288
16 Claims. (Cl. 235—153)

This invention relates to digital computer systems and particularly concerns circuit arrangements providing for addition or subtraction of binary numbers.

In a conventional add or subtract circuit, the time interval allowed for completion of each step of addition or subtraction must be sufficiently long to provide for propagation of electrical "carry" signals through every order of the highest order number the system is capable of combining. In other words, the time required for performance of a series of steps of addition or subtraction is equal to the number of steps performed times the fixed interval determined by the maximum number of carries that could ever possibly occur in any one step.

In accordance with the present invention, during its performance of each step of addition, or subtraction, the new adder or subtractor network contemporaneously performs a checking operation for completeness and correctness of the resulting sum or difference of the particular numbers involved, whereupon the next step may be immediately initiated without waiting for any additional time corresponding with orders not involved in the addition or subtraction of those particular numbers. Since the time consumed in any individual step is no greater than required for propagation of the actual number of carry signals involved in combining the particular numbers of that step, the total time required to perform and check a series of additions, or subtractions, is on the average much less than required by the conventional adder or subtractor to perform the same series of operations to obtain an unchecked answer. Stated somewhat differently and more generally, one portion of the digital computer network perfroms a mathematical operation to produce the resultant of that operation upon two quantities and another portion of the network performs the inverse mathematical operation upon said resultant and one of the two original quantities so that in absence of malfunctioning of components of the network the resultant of the inverse operation corresponds with the other of the two original quantities.

More particularly, and as utilized for addition, while the augend and addend signals are being combined in one portion of the new computer network to produce the sum signal, the addend is being contemporaneously subtracted from such sum in another portion of the network to produce a difference signal. The augend and difference signals are compared, and when, corresponding to each other, combine to produce a check signal which indicates that the addition, including the propagation of carry signals, is complete and correct. Such check signal may also be used as a start signal to initiate the next step.

More particularly and as utilized for subtraction, while the subtrahend and minuend signals are being combined in one portion of the network to produce the difference signal, the subtrahend is being contemporaneously added to the difference in another portion of the network to produce a sum signal. The minuend and sum signals are compared, and when corresponding to each other, combine to produce a check signal indicating that the subtraction, including the propagation of carry signals, is complete and correct. Such check signal may also be used as a start signal to initiate the next step.

More specifically and preferably, the same network may be used for performing either self-checking addition or self-checking subtraction by inclusion of selectively operable gating means effective in each stage to combine the proper signals for registering the sum, or difference, of digits of the corresponding order and also to combine the proper signals for indication of the completion and correctness of such sum or difference. When the check signals for the orders involved all indicate completion and correctness of the individual digit sums or differences, they jointly effect production of a check signal indicative of the completeness of the total sum or differerence, including all carries, and correctness of such total sum or difference.

Still more specifically, each stage of the complete system includes three devices producing output signals respectively representative of the addend-subtrahend value, of the augend-difference value, and the sum-minuend value; it includes selectively operable add and subtract gates; two combining means for combining the addend-subtrahend signal with the augend-difference signal and with the sum-minuend signal to produce two outputs, one of which, in dependence upon the selected gate, is utilized to register the result of the addition or subtraction, and the other of which is utilized to indicates the completeness and correctness of such addition or subtraction including any carry to or from that stage or order.

Further in accordance with the invention, each of the aforesaid two combining means of each stage comprises two AND devices, an OR device and two EXCLUSIVE-OR devices; the two gating means each comprises two AND devices and an inverter; and the comparator means comprises two EXCLUSIVE-OR devices and an AND device.

The invention further resides in a new and useful add-subtract network or system having features of combination and arrangement hereinafter described and claimed.

For a more detailed understanding of the invention, reference is made in the following description to the accompanying drawings in which:

FIG. 4A is similar to FIG. 4, the heavy lines identifying circuits activated for addition of particular binary numbers.

Figure 1:
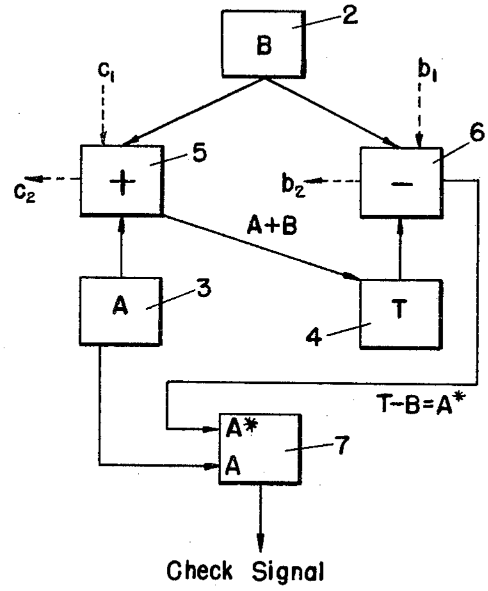
FIG. 1 is a block diagram illustrative of use of the basic network for addition.

Referring to FIG. 1, the blocks 2, 3, and 4 are generically representative of devices or registers each capable of storing information in the binary code. The block 5 is generically representative of means for combining the output signals of the registers 2 and 3 to produce a resultant output representative of the sum of the binary numbers A and B respectively stored in those registers. Such output, in FIG. 1, is applied to register 4, as indicated, to store the value T which should correspond with the sum of values A and B.

The block 6 is generically representative of means for combining the output signals of registers 2 and 4 to produce a resultant output signal A* corresponding with the difference resulting from subtraction of value B from value T.

The block 5 effectively performs the mathematical operation of addition upon the quantites A and B to produce a resultant quantity T: the block 6 effectively performs the inverse mathematical operation of subtraction upon such resultant quantity (T) and one (B) of the original quantities to produce a resultant quantity (A*) which should correspond with the other original quantity (A).

The block 7 is generically representative of means for comparing the output signal A* of the combining means 6 with the output signal A of the register 2. When these compared signals correspond, as they will when the circuit components are functioning properly, the comparator 7 produces an output signal indicating that the sum T stored in or registered by the device 4 is correct.

The preceding description of FIG. 1 is generally applicable to a multi-order self-checking adder and to a single order self-checking adder.

The basic network of FIG. 1, as above described, may, as later shown in discussion of FIG. 4, be duplicated for each order so that in a multi-stage computer suited for addition of binary numbers of the Nth order, there are N basic networks in which the addition of digits of corresponding order is effected and contemporaneously checked as above briefly described. The orders not involved in a step of addition of the particular numbers stored in the A and B registers immediately produce a check signal; when the digit addition has been completed and checked as correct in the orders which are involved, all of the comparators produce check signals indicating that all of the digit additions have been correctly completed and that the totalized sum indicated by the T registers is correct and complete. Preferably and as later described, the check signals of the individual orders may be applied to a multi-order AND gate to provide a check signal indicating completion of the adding operation and correctness of the indicated total.

In the upper five lines of Table I below, there are shown in the successive columns all of the various combinations of digital values A and B, of any carry $C_1$ from the preceding order, the resulting values of their sum T and of any carry $C_2$ to the next higher order. This part of Table I constitutes the binary addition rules of a full adder.

In the lower part of Table I, there are shown all of the various corresponding combinations of values T and B, of their difference A* and of any borrows $b_1$, $b_2$ from or to the next higher and next lower orders respectively.

*Table I (For Addition)*

| | | | | | | | | |
|---|---|---|---|---|---|---|---|---|
| Augend A | 0 | 1 | 0 | 1 | 1 | 0 | 1 | 0 |
| Addend B | 0 | 0 | 1 | 1 | 0 | 1 | 1 | 0 |
| Carry $C_1$ | 0 | 0 | 0 | 0 | 1 | 1 | 1 | 1 |
| Sum T | 0 | 1 | 1 | 0 | 0 | 0 | 1 | 1 |
| Carry $C_2$ | 0 | 0 | 0 | 1 | 1 | 1 | 1 | 0 |
| Minuend T | 0 | 1 | 1 | 0 | 0 | 0 | 1 | 1 |
| Subtrahend B | 0 | 0 | 1 | 1 | 0 | 1 | 1 | 0 |
| Borrow $b_1$ | 0 | 0 | 0 | 0 | 1 | 1 | 1 | 1 |
| Difference A* | 0 | 1 | 0 | 1 | 1 | 0 | 1 | 0 |
| Borrow $b_2$ | 0 | 0 | 0 | 1 | 1 | 1 | 1 | 0 |

It will be observed that for the digital values of A, B and their sum T in the first four columns of Table I, the value of the difference $(T-B)$ corresponds with the value of augend A. Thus, for these combinations of values A and B, the outputs of register 3 and combining means 6 as applied to the comparator 7 produce, for the addition of $A+B$, a check signal as above described in discussion of FIG. 1. However, in each of the last four columns of Table I involving an input carry $C_1$, the value of the difference $(T-B)$ does not correspond with the value of augend A. Such correspondence is, however, attained by effectively combining a borrow signal $b_1$ with B and subtracting the resultant from T in combining means 6 (see lines 6–8 of Table I). The resultant output signal A* (i.e., $T-(B+b_1)$ applied to the comparator 7 thus matches the augend signal A, as indicated by the next lowermost line of Table I, for all possible combinations of concurrent values of A, B, and $C_1$.

Thus, for all combinations of augend A, addend B and carry $C_1$, the network of FIG. 1, as forming one stage of a computer, effects addition of the digital values A and B and of any input carry $C_1$ from the preceding stage to produce their sum T in register 4, passes any output carry $C_2$ to the next higher stage, subtracts the value B (plus any input borrow $b_1$ from the preceding stage) from the sum value T to obtain a computed difference value A*, passes any output borrow $b_2$ to the next higher stage, compares the computed difference value A* with the original value A, and produces a check signal indicative of completeness and correctness of the addition including any input carry.

Figure 2:
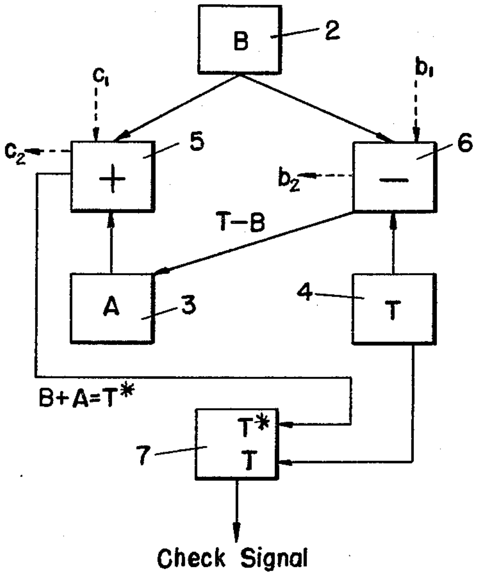
FIG. 2 is a block diagram illustrative of use of the basic network for subtraction.

The network shown in FIG. 2 has the same components as that of FIG. 1, and as previously described, the combining means 5 effectively adds the values A and B, and the combining means 6 effectively subtracts the value B from value T. However, in FIG. 2, as distinguished from FIG. 1, the output signal of combining means 6 is applied to register 3 for indication or storage of value A as the result of subtraction of B from T, and the output signal of combining means 5 is applied to comparator 7 for comparison with a signal representative of the minuend T. When these compared signals are matched, the comparator 7 produces a signal indicating that the subtraction of B from T has been completed and the the indicated or stored difference value A is correct.

The preceding description of FIG. 2 is applicable to a multi-order self-checking subtractor. It is also applicable to FIG. 2 as the basic network of a single stage which is duplicated in successive stages to handle multi-order binary numbers. In such case, the stages not involved in a step of subtraction of particular numbers stored in the T and B registers immediately produce a check signal: When the subtraction of digits has been completed and checked in the orders in which they are involved, the production of check signals by all comparators indicates that all of the digital subtractions have been completed and that the totalized difference stored in or indicated by the A registers is correct.

In the upper five lines of Table II below, there are shown all of the various combinations of digital values of T and B of any borrow $b_1$ from the preceding order, the resulting values of their difference A and of any borrow $b_2$ to the next higher order. This part of the table embodies the binary subtraction rules of a full subtractor.

In the lower portion of Table II, there are shown all of the various corresponding combinations of values A and B, their computed sum T* and any input and output carries $C_1$, $C_2$.

*Table II (For Subtraction)*

| | | | | | | | | |
|---|---|---|---|---|---|---|---|---|
| Minuend T | 0 | 1 | 0 | 1 | 1 | 0 | 1 | 0 |
| Subtrahend B | 0 | 0 | 1 | 1 | 0 | 1 | 1 | 0 |
| Borrow $b_1$ | 0 | 0 | 0 | 0 | 1 | 1 | 1 | 1 |
| Difference A | 0 | 1 | 1 | 0 | 0 | 0 | 1 | 1 |
| Borrow $b_2$ | 0 | 0 | 1 | 0 | 0 | 1 | 1 | 1 |
| Augend A | 0 | 1 | 1 | 0 | 0 | 0 | 1 | 1 |
| Addend B | 0 | 0 | 1 | 1 | 0 | 1 | 1 | 0 |
| Carry $C_1$ | 0 | 0 | 0 | 0 | 1 | 1 | 1 | 1 |
| Sum T* | 0 | 1 | 0 | 1 | 1 | 0 | 1 | 0 |
| Carry $C_2$ | 0 | 0 | 1 | 0 | 0 | 1 | 1 | 1 |

It will be observed that for the digital values of minuend T, subtrahend B and their difference A in the first four columns of Table II, the value of the sum $(A+B)$ corresponds with the minuend T. Thus, for these combinations of values of T and B, the outputs of register 4 and combining means 5 as applied to comparator 7 produce, for the subtraction of B from T, a check signal as above described in discussion of FIG. 2. However, in the last four columns of Table II, the value of the sum $(A+B)$ does not correspond with the minuend T. Such correspondence is attained by combining a carry signal $C_1$ from the preceding order with the A and B signals to the combining means 5 (see lines 6–8 of Table II). The resulting sum signal T* (i.e., $A+B+C_1$) applied to the comparator 7 thus matches the minuend signal T, as indicated by the next lowermost line of Table II, for all possible combinations of concurrent values of T, B and $b_1$.

Thus, the network of FIG. 2, as forming one stage of a multi-order subtractor, effects subtraction of B plus borrow $b_1$ from T to produce the difference A in register 3, passes the borrow $b_2$ to the next higher order, adds the computed value A to the value B (and any input carry $C_1$ from the preceding stage) to produce a computed sum value T*, passes any output carry $C_2$ to the next higher stage, compares the computed sum value T* with the original value T, and produces a check signal indicative of completion and correctness of such subtraction.

Figure 3:
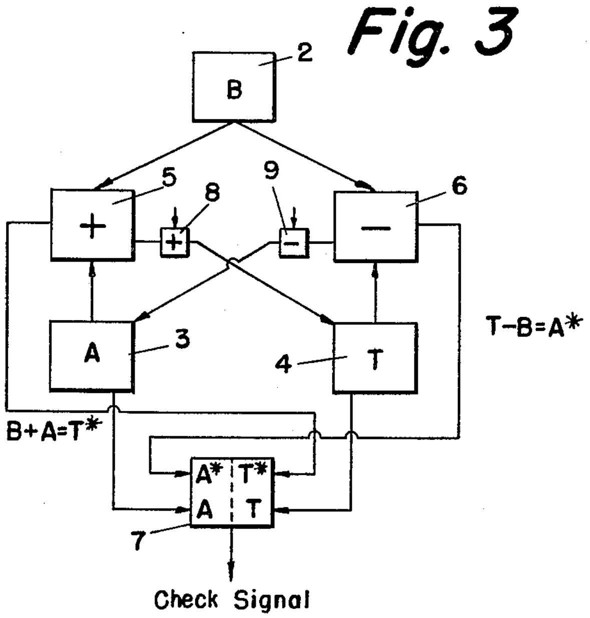
FIG. 3 is a block diagram illustrative of the basic network with gating means included for use either for addition or for subtraction.

The basic networks of FIGS. 1 and 2 may be combined, as in FIG. 3, to provide an arrangement capable of selectively performing self-checking addition and self-checking subtraction. Like each of FIGS. 1 and 2, the network of FIG. 3 comprises registers 2, 3 and 4 for producing outputs respectively representing A, B and T values, combining means 5 for producing an output representative of the sum of $A+B$, combining means 6 for producing an output representative of the difference $T-B$, and a comparator 7 for producing a check signal. Additionally, the network of FIG. 3 includes the gating means 8 and 9 which may be selectively activated to condition the network for subtraction of two values or for addition of two values.

Specifically, when it is desired to add two values, one of them may be loaded in register 3 as augend A, and the other loaded in register 2 as addend B. The Add-gate 8 is activated so that the algebraic summation (arithmetic sum) of A and B, as effected by combining means 5, is applied to register 4 for indication of T as the result of addition of A to B. At the same time, the combining means 6 produces an output representative of the difference $T-B$ and applies it to the comparator 7 for checking against augend A—all as heretofore discussed in connection with FIG. 1 and Table I.

When it is desired to subtract two values, one of them is loaded in register 4 as minuend T, and the other is loaded in register 2 as subtrahend B. The SUBTRACT-gate 9 is activated so that the algebraic summation (arithmetic difference) of T and B as effected by combining means 6 is applied to register 3 for indication of A as the difference $T-B$. At the same time, the combining means 5 produces an output representative of the sum B+A and applies it to the comparator 7 for checking against minuend T—all as previously discussed in discussion of FIG. 2 and Table II.

Figure 4:
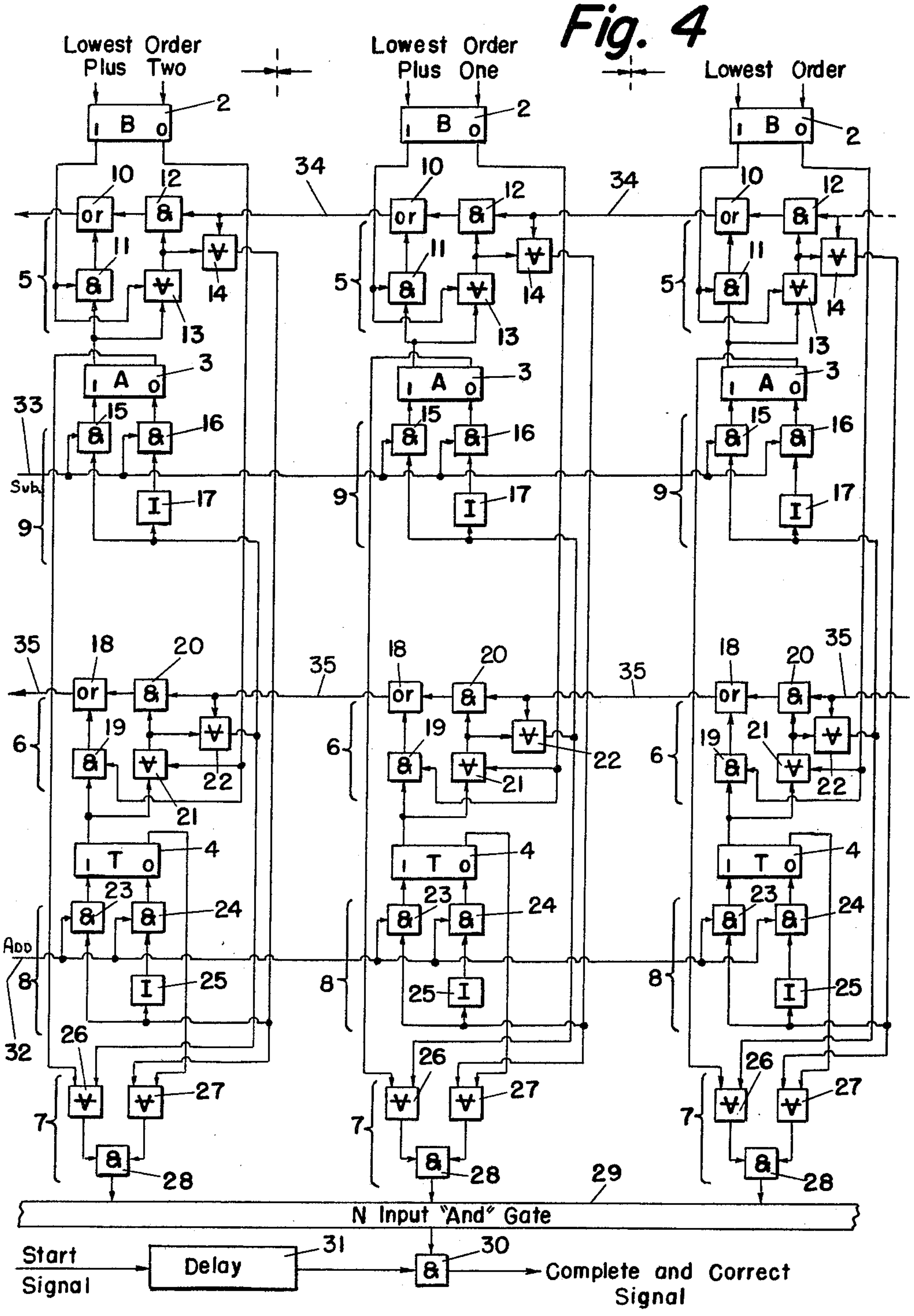
FIG. 4 is a block diagram of three stages of a multi-order system, each stage being generically similar to FIG. 3 but in more detail showing the composition of the network.

FIG. 4 illustrates a preferred specific embodiment of the add-subtract system of FIG. 3 and in more detail illustrates the composition of three stages of a system having N stages. As the elements and their interconnections are the same for each stage, only one stage need be discussed in detail. The corresponding elements of the different orders are identified by the same reference characters with suffixes D, E or F identifying the stage in which included.

Referring, for example to the middle order of FIG. 4, the elements 2, 3 and 4 are bistable trigger or flip-flop circuits using electronic tubes, transistors or the like for respectively storing the binary values of digits B, A of the corresponding order of multi-order binary numbers and of their sum T. The ADDER 5 comprises an OR circuit 10; two AND circuits 11, 12; and two EXCLUSIVE-OR circuits 13, 14. The ADD-gate 8 comprises two AND circuits 23, 24 and an inverter 25. The SUBTRACTOR 6 has the same composition as the ADDER 5: specifically, it comprises an OR circuit 18; two AND circuits 19, 20; and two EXCLUSIVE-OR circuits 21, 22. The SUBTRACT-gate 9 has the same composition as the ADD-gate 8: specifically, it comprises two AND circuits 15, 16 and an inverter 17. The comparator 7 comprises two EXCLUSIVE-OR circuits 26, 27 and an AND circuit 28.

Figure 4B:
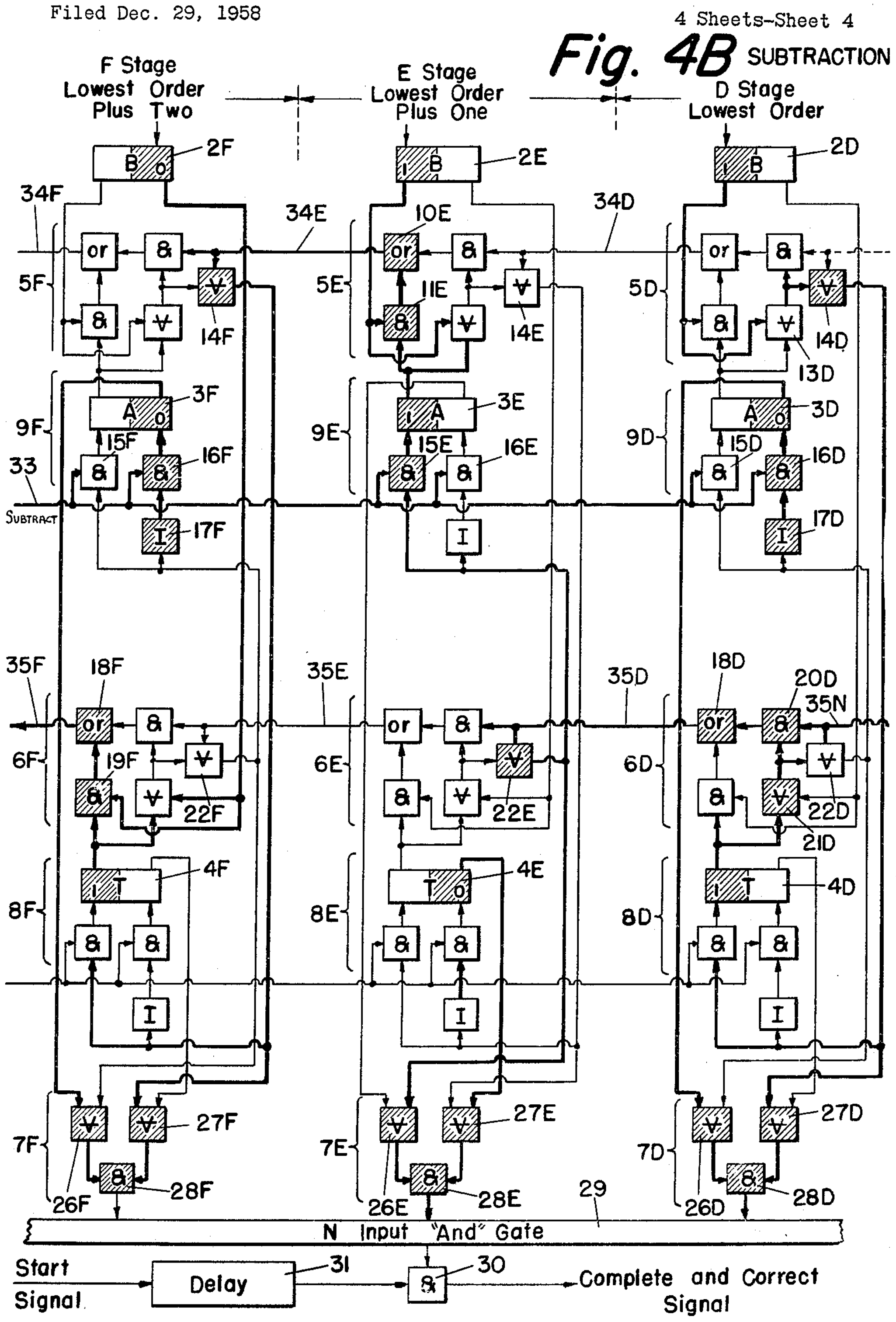
FIG. 4B is similar to FIG. 4, the heavy lines identifying the circuits activated for subtraction of particular binary numbers.

It will be assumed for purposes of explanation in the discussion of FIGS. 4, 4A and 4B, that: the "1" and "0" output signals of the A, B and T registers are positive voltages; each of the various AND circuits produces a positive output voltage when, and only when, both of its input circuits have a positive voltage applied to them; each of the various OR circuits produces a positive output voltage when either of its input circuits has a positive voltage applied thereto; each of the inverters produces a negative output voltage when a positive voltage is applied thereto and vice versa; and that each of the various EXCLUSIVE-OR circuits produces a positive output signal when either, but not both, of its inputs has a positive voltage applied thereto and produces a negative output voltage under other conditions. All of these component circuits may be of types per se known and consequently need not be specifically described.

The output or check signals of the individual comparators of the respective stages are applied to a multiple input AND-gate 29. Thus, when all of the comparators supply check signals respectively indicating completed and correct addition or subtraction of the digits of the corresponding orders, the gate 29 produces a check signal indicating completion of the entire operation of addition or subtraction and correctness of the totalized sum stored in the T registers, or the totalized difference stored in the A registers. In the particular arrangement shown in FIG. 4, this over-all check signal is applied as an input to the AND circuit 30 where it is combined with a delayed start signal fed to it through delay circuit or network 31. The output of the AND circuit 30 provides a "complete and correct" signal. The start signal may be derived from a pulse used to load the B register, and such pulse may be initiated by the "complete and correct" signals of the preceding step of addition or subtraction.

The instruction to ADD is given by applying to line 32 a positive input signal for the AND-gates 23, 24 of all stages. The instruction to SUBTRACT is given by applying to line 33 a positive input signal for the AND-gates 15, 16 of all orders. The operation of the networks in executing such instructions can best be explained by specific examples such as now discussed in connection with FIGS. 4A and 4B. In these figures, the suffixes D, E, F are added to reference characters of the elements involved to distinguish between the corresponding elements of the different stages.

Before proceeding with a detailed discussion of FIG. 4A as operating to perform addition of particular binary values of A and B, there is first explained the significance of the interstage lines 34D—34F, 35D—35F. A positive signal on any of lines 34D—34F represents a carry 1 from the lower to the higher stage, whereas a negative signal thereon represents a carry 0. A positive signal on any of lines 35D—35F represents a borrow 0 from the lower to the higher stage, whereas a negative signal thereon represents a borrow 1. With respect to each of the EXCLUSIVE-OR circuits 14D—14F of ADDERS 5D—5F respectively, a positive output signal represents a computed sum T* having a value of 1, whereas a negative output signal represents a computed sum T* having a value of 0. With respect to each of the EXCLUSIVE-OR circuits 22D—22F of the SUBTRACTORS 6D—6F respectively, a positive output signal represents a computed Difference A* having a value of 1, whereas a negative output signal represents a computed Difference A* having a value of 0. With respect to each of the AND circuits 28D—28F of comparators 7D—7F respectively, a positive output signal indicates that the addition of the augend and addend of the corresponding stage and of the carry, if any, from the previous stage is complete and correct.

In FIG. 4A, the heavy lines indicate the connections which are or become active in the operation of adding the addend 001 in the registers 2D to 2N to the augend 011 in the registers 3D to 3N and to produce a check signal when such operation has been completely and correctly performed. The AND, OR and EXCLUSIVE-OR circuits which are effective during such operations are shaded for convenience in following the subsequent discussion.

The 1's in the registers 2D, 3D are combined in the

AND circuit 11D of ADDER 5D so that the OR circuit 10D of ADDER 5D produces a carry "1" transferred by line 34D into the second stage. This carry is combined in the ADDER 5E of the second stage with the "1" of the register 3E of the second stage to produce a carry "1" on line 34E to the third stage.

In producing such carry to the third stage, the "1" output of register 3E is passed by the EXCLUSIVE-OR circuit 13E of ADDER 5E to the AND circuit 12E to which the carry "1" of the first stage is also applied from line 34D. The AND circuit 12E therefore activates one input of the OR circuit 10E to produce the carry "1" transmitted by line 34E into ADDER 5F of the third stage.

The EXCLUSIVE-OR circuit 14F of ADDER 5F produces a positive output signal applied to the AND circuit 23F already conditioned by the ADD instruction. The output of this AND circuit 23F as applied to register 4F provides that a "1" is indicated or stored in the SUM register 4F of the third stage F.

The resulting positive signal from the 1 output of register 4F as applied to the AND circuit 19F of SUBTRACTOR 6F together with the positive signal from the 0 output of the addend register 2F activates the OR circuit 18F to pass a borrow 0 signal over line 35F to the next higher stage (not shown). If stage F were the last stage of the ADDER/SUBTRACTOR system, then the borrow output would be connected for application as the borrow input of the first stage D.

Before proceeding with a detailed description of how the correctness of the 1 stored in SUM register 4F is checked, there is first briefly described the composition and connections of comparator 7F. Its EXCLUSIVE-OR circuit 26F has its inputs connected respectively to the 0 output of register 3F and the 1 output (from EXCLUSIVE-OR circuit 22F) of SUBTRACTOR 6F so that it matches the true value of the augend A with its complement value. Similarly, the EXCLUSIVE-OR circuit 27F of comparator 7F has its inputs connected respectively to the 0 output of register 4F and to the 1 output (from EXCLUSIVE-OR circuit 14F) of ADDER 5F so that it matches the true value of the sum T with its complement value. The AND circuit 28F of comparator 7F has its inputs respectively connected to the outputs of the EXCLUSIVE-OR circuits 26F, 27F. Thus, if and when the aforesaid matching is completed by the EXCLUSIVE-OR circuits 26F and 27F, the AND circuit 28F is rendered effective to produce a positive output signal indicating that the addition up to stage F is complete and correct.

Applying to the particular example under discussion the foregoing test if the addition is complete and correct, then the register 3F provides a signal which is the complement of the signal provided by SUBTRACTOR 6F; it is pointed out that in stage F, the EXCLUSIVE-OR circuit 22F, which provides the output of SUBTRACTOR 6F, produces a negative signal while the 0 output of register 3F produces a positive signal. In response to these complementary signals, the EXCLUSIVE-OR circuit 26F of comparator 7F produces and applies to one input of AND circuit 28F a positive signal indicating that the computed difference value A* is identical with the original augend value A. Applying the second test that if the addition is complete and correct the register 4F stores a value which is the complement of the value provided by the ADDER 5F, it is pointed out that in stage F the EXCLUSIVE-OR circuit 14F of ADDER 5F (which provides the 1 output of ADDER 5F) produces a positive signal, while the 0 output of the register 4F produces a negative signal. In response to these complementary signals, the EXCLUSIVE-OR circuit 27F produces and applies a positive signal to the remaining input of AND circuit 28F which thereupon applies to the N-input AND gate 29 a positive signal indicating that the addition up to stage F is complete and correct.

If for any reason the SUM-4F-output was 0 instead of 1, the EXCLUSIVE-OR circuit 27F would have like signals applied to both of its input circuits and in consequence the AND circuit 28F would not be activated to produce the check signal. If for any reason the output of register 3F was 1 instead of 0, the EXCLUSIVE-OR circuit 26F would have like signals applied to both of its input circuits, and in consequence the AND circuit 28F would not be activated to produce the check signal.

Reverting now to the second stage, which as thus far described has provided only the carry 1 for the third stage, the 1 signal from the augend register 3E and the carry 1 signal from the ADDER 5D of the first stage as applied to the EXCLUSIVE-OR circuit 14E produces a negative output signal which is applied to the inverter 25E where it is inverted to a positive signal and applied to the AND circuit 24E. Since the AND circuit 24E is at this time conditioned by the positive INSTRUCTION signal on the ADD line 32, the positive signal from the inverter 25E passes via the AND circuit 24E to turn-off or reset Register 4E so to enter the sum 0 therein.

The correctness of the 0 stored in the Sum Register 4E of the second stage E is checked as follows. From the preceding discussion of stage F, it should be understood that if the addition in stage E is correct and complete, the Register 3E provides a signal which is the complement of the signal provided by SUBTRACTOR 6E. In the particular example under discussion, the EXCLUSIVE-OR circuit 22E produces a positive signal while the 0 output of register 3E produces a negative signal. In response to these complementary signals, the EXCLUSIVE-OR circuit 26E of comparator 7E produces and applies to one input of AND circuit 28E a positive signal indicating that the computed difference value A* is identical with the original augend value A. From the preceding discussion of stage F, it should also be understood that if the addition in stage E is complete and correct, the register 4E stores a value which is the complement of the value provided by ADDER 5E. In the particular example under discussion, the EXCLUSIVE-OR circuit 14E provides a negative signal while the 0 output of register 4E produces a positive signal. In response to application of these complementary signals, the EXCLUSIVE-OR circuit 27E produces and applies a positive signal to the remaining input of AND circuit 28E which thereupon applies to the N-input AND gate 29 a positive signal indicating that the addition up to Stage E is complete and correct.

From the foregoing, it will be appreciated that if in the example under discussion a "1" was stored in Sum Register 4E instead of a 0, the AND circuit 28E would not produce a positive output signal and no check signal would be produced by comparator 7E.

Reverting now to the first stage D which as thus far described has provided only the "carry 1" for the second stage, the negative output from the EXCLUSIVE-OR circuit 14D of ADDER 5D provides that the inverter 25D has a positive output which as applied to the conditioned AND circuit 24D causes that AND circuit to produce a positive signal applied to store a "0" in the SUM register 4D of the first stage. This completes the description of the execution, by the three stages involved, of the instruction to add the binary numbers 001 and 011.

The correctness of the 0 stored in the Sum Register 4D of the first stage D is checked as follows. If the addition is complete and correct, the output signal of the SUBTRACTOR 6D should be the complement of the value in register 3D. In the particular example under discussion, the EXCLUSIVE-OR circuit 22D of the SUBTRACTOR 6D produces a positive output signal applied to one input circuit of the EXCLUSIVE-OR circuit 26D of comparator 7D, whereas the 0 output of register 3D produces a negative signal applied to the other input circuit of the EXCLUSIVE-OR circuit 26D. In response to such application of complementary signals, the EX- CLUSIVE-OR circuit 26D produces a positive signal to one input of AND circuit 28D indicating that the computed difference A* is identical with the original augend A. If the addition is complete and correct, the output signal of the ADDER 5D should be the complement of the value in the Sum Register 4D. In the particular example under discussion, the EXCLUSIVE-OR circuit 14D produces a negative signal, whereas the 0 output of register 4D produces a positive signal. These complementary signals as applied to the EXCLUSIVE-OR circuit 27D produce a positive signal applied to the remaining input of AND circuit 28D which thereupon produces a positive signal applied to the N-input AND gate 29 and indicating that the first stage has completed a correct addition of the first-order digits.

If for any reason the output of the SUM register 4D was 1 instead of 0, negative signals would be applied to both input circuits of the EXCLUSIVE-OR circuit 27D with the consequence that the AND circuit 28D would not be activated to produce the check signal.

When all of the comparators 7D, 7E and 7F of the three stages involved produce check signals, the multi-input AND-gate 29 produces a total check signal which indicates completion of the addition of addend 001 to augend 011 and correctness of the total 100 indicated or stored in the SUM registers 4F, 4E and 4D. It is to be noted that no matter how many more stages may be included in the system for addition of binary numbers having many more than three digits, the total check signal is given in the example discussed as soon as the three stages involved have correctly completed the addition of the two specified three-order digits. Addition of other three-order digit numbers may produce a carry to the fourth-order stage; in which case that stage is also involved and the total check signal is not given until the comparator (7G not shown) of that stage also supplies a positive signal to the N-input AND-gate 29. All orders higher than those involved in any particular addition apply their individual digit check signals to gate 29 from the time the Start-signal is given.

As shown, the output of gate 29 may be applied to an AND circuit 30 whose other input circuit receives the Start-signal after a brief delay afforded by the delay line of network 31. The output of the AND circuit 30 thus provides a total "complete and correct" signal which is free of disturbance or transients incident to execution of the requested addition.

It is to be understood that although for clarity of explanation the various steps have been described in a particular sequence, they are being contemporaneously performed in the same and different stages. It is also to be noted that despite the length of time required to describe these operations, in practice they are completed and checked in less than a millionth of a second by apparatus constructed in accordance with the invention.

In FIG. 4B, the heavy lines indicate those which become active in execution of the instruction to subtract with the minuend 101 in the registers 4D to 4N and with the subtrahend 011 in the registers 2D to 2N. The devices which are effective during such operation and checking thereof are shaded to facilitate following of the explanation below.

The instruction of SUBTRACT is given by applying a positive signal to line 33 common to the AND circuits 15, 16 of all stages 2D–2N. After the start signal is given, the positive signal produced by the 1 output of minuend register 4D as applied to the EXCLUSIVE-OR circuit 21D of SUBTRACTOR 6D provides one input signal for the AND circuit 20D. Line 35N from the highest order stage applies a borrow 0 signal to the other input line of AND circuit 20D. The AND circuit 20D thereupon activates the OR circuit 18D of the subtractor to produce a borrow 0 signal which is supplied by line 35D to the second stage.

The EXCLUSIVE-OR circuit 22D of the subtractor produces a negative output so that inverter 17D applies a positive signal to the AND circuit 16D conditioned by the instruction to subtract. Thus, this AND circuit effects entry of a 0 in the DIFFERENCE register 3D. This completes execution of the instruction to subtract so far as the lowest order digits are concerned.

Before proceeding with the description of how the completion and correctness of this operation is checked, there is first briefly described how the comparators function during subtraction. Referring to comparator 7D, for example, the EXCLUSIVE-OR circuit 27D has its inputs connected respectively to the output of ADDER 5D and to the 0 output of register 4D. Consequently the EXCLUSIVE-OR circuit 27D matches the output of ADDER 5D with the 0 output of register 4D: i.e., the true value of the minuend is matched with its complement value. Similarly, the EXCLUSIVE-OR circuit 26D has its inputs connected respectively to the output of the SUBTRACTOR 6D and the 0 output of register 3D. Consequently, the EXCLUSIVE-OR circuit 26D matches the output of the SUBTRACTOR 6D with the 0 output of register 3D: i.e., the true value of the difference between the minuend and the subtrahend is matched with its complement value. When the matching is completed by both of the EXCLUSIVE-OR circuits 26D, 27D, the AND circuit 28D is rendered effective to produce a positive signal indicating that the subtraction is complete and correct.

Reverting to the particular example under discussion, the EXCLUSIVE-OR circuit 14D (which provides the 1 output of ADDER 5D) produces a positive signal while the 0 output of register 4D produces a negative signal. These complementary signals are applied to the EXCLUSIVE-OR circuit 27D which in response thereto produces and applies to one input of AND circuit 28D a positive signal indicating that the computed sum value T* is identical with the original minuend value T. Additionally, if the subtraction is complete and correct, the value stored in register 3D is the complement of the value provided by SUBTRACTOR 6D. In the particular example under discussion, the EXCLUSIVE-OR circuit 22D (which provides the 1 output of SUBTRACTOR 6D) produces a negative signal while the 0 output of register 3D produces a positive signal. These complementary signals are applied to the EXCLUSIVE-OR circuit 26D which in response thereto applies a positive signal to the remaining input of AND circuit 28D so to render it effective to produce a positive signal indicating that the subtraction performed in the first stage is complete and correct. This check signal from AND circuit 28D is applied to the N-input AND-gate 29.

In the second stage E, the positive "borrow 0" signal from the first stage, as introduced into the SUBTRACT circuit 6E over line 35D activates the EXCLUSIVE-OR circuit 22E thereof to provide a positive output signal applied to one input of the AND circuit 15E of the subtract gate. Since the AND circuit 15E is conditioned by the positive "Instruction to Subtract" signal applied to its other input circuit, it produces a positive output signal effective to store a 1 in the Difference register 3E.

The positive signal from the 1 output of the DIFFERENCE register 3E is combined in the AND circuit 11E of ADDER 5E with the positive signal from the 1 output of subtrahend register 2E to produce a positive signal activating the OR circuit 10E so to produce a positive "carry 1" signal supplied over line 34E to the next higher stage. This completes the execution of the instruction to subtract so far as the second order digits are concerned. This execution and its correctness are checked as follows.

Assuming the subtraction is complete and correct, the input signals applied to the EXCLUSIVE-OR circuit 27E of the comparator 7E from the register 4E and the ADDER 5E should be complementary. In the particular example under discussion, the output signal from the EXCLUSIVE-OR circuit 14E of the ADDER 5E is negative and the 0 output of register 4E produces a positive signal. The resulting positive output signal of the EXCLUSIVE-OR circuit 27E indicates that the computed Sum value T* is identical with the original minuend value T. Also if the subtraction is complete and correct, the input signals applied to the EXCLUSIVE-OR circuit 26E of comparator 7E from the register 3E and the SUBTRACTOR 6E should be complementary. In the particular example under discussion, the signal from the 0 output of register 3E is negative and the output signal from the EXCLUSIVE-OR circuit of SUBTRACTOR 6E is positive. The resulting positive output signal of EXCLUSIVE-OR circuit 26E is applied to the remaining input of AND gate 28E which thereupon produces and applies to the N-input AND gate 29 a positive signal indicating that the subtraction is complete and correct for stage E.

In the third stage F, the positive signal from the 1 output of minuend register 4F and the positive signal from the 0 output of subtrahend register 2F are applied to the AND circuit 19F of SUBTRACTOR 6F. The resulting positive signal from AND circuit 19F as applied to OR circuit 18F of SUBTRACTOR 6F provides a positive "borrow-0" signal transmitted over line 35F to the next higher stage. The negative output signal from EXCLUSIVE-OR circuit 22F of SUBTRACTOR 6F is inverted by inverter 17F. The resulting positive output signal of inverter 17F is applied to one input of AND gate 16F already conditioned by the positive signal on the Subtract Line 33. The resulting positive output signal of AND gate 16F effects storage of a 0 in the Difference register 3F. This completes execution of the instruction to subtract so far as Stage F is concerned. The completion and correctness of the execution is checked as follows.

Assuming the subtraction is complete and correct, the signals applied to the EXCLUSIVE-OR circuit 27F of comparator 7F from the reigster 4F and the ADDER 5F should be complementary. In the particular example under discussion, the output signal from the EXCLUSIVE-OR circuit 14F of ADDER 5F is positive while the 0 output of register 4F produces a negative signal. The resulting positive output signal of the EXCLUSIVE-OR circuit 27F indicates that the computed Sum value T* is identical with the original minuend value T. Also if the subtraction effected in Stage F is complete and correct, the signals applied to the EXCLUSIVE-OR circuit 26F of comparator 7F from the register 3F and the SUBTRACTOR 6F should be complementary. In the particular example under discussion, the signal from the 0 output of register 3F is positive and the output signal from the EXCLUSIVE-OR circuit of SUBTRACTOR 6F is negative. The resulting positive output signal of EXCLUSIVE-OR circuit 26F is applied to the remaining input of AND-gate 28F which thereupon produces and applies to the N-input AND-gate 29 a positive signal indicating that the subtraction is complete and correct for stage F.

When all of the comparators 7D, 7E and 7F produce check signals, the multi-input AND-gate 29 to which they are applied produces an over-all check signal which indicates completed execution of the instruction to subtract subtrahend 011 from minuend 101 and which also indicates correctness of the result 010 indicated or stored in the DIFFERENCE registers 4F, 4E and 4D. Regardless of many higher order stages may be in the system to suit it for subtraction of binary numbers of order greater than three, such total check signal is given in the foregoing example as soon as the requested subtraction of the three-order digit numbers is complete and correct. Subtraction of other three-order digits from a larger three-order digit may produce a borrow from the fourth-order stage, in which event that stage is also involved and the total check signal is not given until the comparator of that stage also supplies a positive signal to the N-input AND-gate 29. In the example discussed, the comparators of all stages of order higher than three apply individual check signals to gate 29, at the time the Start signal is given.

Preferably and as shown, the output of gate 29 is applied to AND circuit 30 whose other input circuit receives the Start signal after a brief delay afforded by delay network 31. Thus, the output of the AND circuit 30 provides a "complete and correct" signal which is free of transients incident to execution and checking of the requested subtraction.

It is to be understood that, as with addition, the steps of subtraction, producing carries, and checking, proceed contemporaneously in the different orders. From the foregoing examples, it should be clear how the system of FIG. 4 effects and checks the addition of any two binary values and effects and checks the subtraction of any binary number from a larger binary number. With minor modifications, the system of FIG. 4 may also be utilized to subtract any binary number from any smaller binary number. In this connection, it is pointed out in such cases that there will be always a borrow from the highest order to the lowest order: this can be used, as will be understood by those skilled in the art, to complement the difference value stored in register 3 of FIG. 4 for direct indication of the corrected difference.

What is claimed is:

1. An electrical network arrangement for algebraically adding two numerical values comprising means producing coexistent electrical signal outputs respectively representative of said numerical values, a first combining means responsive to said signal outputs for producing a third coexistent electrical signal output representative of the algebraic sum of said numerical values, a second combining means for performing the inverse of the function of said first combining means and responsive to said third signal output and to the signal output corresponding with one of said two numerical values to produce a fourth coexistent electrical signal output, and comparison means responsive to said fourth signal output and the signal output representative of the other of said two numerical values for producing an electrical check signal indicating that the algebraic summation of said two numerical values is complete and is correctly represented by said third signal output.

2. An electrical network arrangement for determining the arithmetic sum of two numerical values comprising means producing coexistent electrical signal outputs respectively representative of said numerical values, a first combining means responsive to said signal outputs for producing a third coexistent electrical signal output respresentative of the arithmetic sum of said numerical values, a second combining means for performing the inverse of the function of said first combining means and responsive to said third signal output from said first combining means and to the signal output from the first-named means which represents one of said numerical values to produce a fourth coexistent electrical signal output representative of their arithmetic difference, and comparison means responsive to said fourth signal output from said second combining means and the signal output from said first-named means which represents the other of said numerical values for producing an electrical check signal indicating that the addition of said two numerical values is complete and is correctly represented by said third signal output.

3. An electrical network arrangement for determining the arithmetic difference of two numerical values comprising means producing coexistent electrical signal outputs respectively representative of said numerical values, a first combining means responsive to said signal outputs for producing a third coexistent electrical signal output representative of the arithmetic difference of said numerical values, a second combining means for performing the inverse of the function of said first combining means and responsive to said third signal output from said first combining means and to the signal output from the first-named means corresponding with one of said numerical values to produce a fourth coexistent electrical signal output representative of the arithmetic sum of such signal outputs, and comparision means responsive to said fourth signal output from said second combining means and the signal output from the first-named means representing the other of said numerical values for producing an electrical check signal indicating that the subtraction is complete and that the diqerence of said numerical values is correctly represented by said third signal output.

4. An electrical network arrangement selectively operable to determine the sum of a first numerical value and a second numerical value or the difference between said first numerical value and a third numerical value comprising means producing electrical signal outputs respectively representing said three numerical values, a first combining means responsive to the coexistent signal outputs representative of said first and second numerical values to produce a coexistent electrical signal output corresponding with their sum, a second combining means for performing the inverse of the function of said first combining means and responsive to the signal outputs representative of said first and third numerical values to produce a coexistent electrical signal output corresponding to their difference, and comparison means responsive to add-subtract instruction signals for selectively comparing said difference signal output with the signal output representative of said second numerical value or said sum signal output with the signal output representative of said third numerical value and to produce an electrical check signal indicative of completion and correctness of the selected operation.

5. An add-subtract network comprising a first means for producing an electrical signal output representative of the addend-subtrahend numerical value, a second means for producing an electrical signal output representative of the augend-difference numerical value, a third means for producing an electrical signal output representative of the minuend-sum numerical value, a first combining means responsive to said augend-difference signal output and to said addend-subtrahend signal output to produce a sum electrical signal output, a second combining means for performing the inverse of the function of said first combining means and responsive to said addend-subtrahend signal output and to said minuend-sum signal output to produce a difference electrical signal output, and gating means responsive to add-subtract instruction signals selectively operable to apply the signal output from said first combining means as an input signal to said third signal output-producing means for indication of the sum of the numerical augend and addend values or to apply the signal output from said second combining means to said second signal output-producing means for indication of the difference of the numerical subtrahend and minuend values.

6. An add-subtract network comprising a first means for producing an electrical signal output representative of the addend-subtrahend numerical value, a second means for producing an electrical signal output representative of the augend-difference numerical value, a third means for producing an electrical signal output representative of the minuend-sum numerical value, a first combining means responsive to said augend-difference signal output and to said addend-subtrahend signal output to produce a sum electrical signal output, a second combining means for performing the inverse of the function of said first combining means and responsive to said addend-subtrahend signal output and to said minuend-sum signal output to produce a difference electrical signal output, gating means responsive to add-subtract instruction signals and selectively operable to apply the signal output from said first combining means as an input signal to said third signal output-producing means or to apply the signal output from said second combining means as an input signal to said second signal output-producing means, and a comparator having two pairs of inputs, one of said pairs consisting of said second signal output and said difference signal output, and the other of said pairs consisting of said third signal output and said sum signal output, said comparator producing an electrical check signal indicating completion and correctness of the operation of the selectively gated combining means upon correspondence of said pairs of inputs.

7. An electrical network arrangement for algebraically adding two multi-order binary numerical values comprising a multiplicity of cascaded stages each connected to the preceding and following stages by carry and no-carry lines, each of said stages comprising (1) means for producing electrical signal outputs respectively representative of the numerical values of the binary digits of the corresponding order, (2) a first combining means responsive to said signal outputs and to electrical signals on one of said lines from the preceding stage for producing a third electrical signal output representatively of the algebraic sum of said digital values and an electrical signal on one of said lines to the following stage, (3) a second combining means for performing the inverse of the function of said first combining means and responsive to said third signal output, to the signal output corresponding with one of said digital values and to electrical signals on the other of said lines from the preceding stage to produce a fourth electrical signal output: and means for checking the completion and correctness of the algebraic addition of said multi-order binary values comprising a plurality of comparators, one in each stage and each comprising comparison means responsive to said fourth signal output of the corresponding stage and the signal output representative of the other of said two digital values of the corresponding order to produce an electrical check signal for the corresponding stage.

8. An electrical network arrangement for selectively effecting addition or subtraction of multi-order binary numbers comprising a multiplicity of cascaded stages, each connected to adjacent stages by lines for carry and no-carry signals, each of said stages comprising (1) a first means for producing an electrical signal output representative of the addend-subtrahend numerical value of the binary digit of the corresponding order, (2) a second means for producing an electrical signal output representative of the augend-difference numerical value of the binary digit of the corresponding order, (3) a third means for producing an electrical signal output representative of the minuend-sum numerical value of the binary digit of the corresponding order, (4) a first combining means associated with a pair of said lines and with said first and second means to produce a sum electrical signal output, (5) a second combining means for performing the inverse of the function of said first combining means and associated with another pair of said lines and with said first and third means to produce a difference electrical signal output, (6) a pair of gating means responsive to Add-Subtract instruction signals and selectively operable respectively to apply the signal output produced by said first combining means as an input signal to said third signal output-producing means or to apply the signal output produced by said second combining means as an input signal to said second signal output-producing means, and (7) a comparator having two pairs of inputs, one of said pairs consisting of said second signal output and said difference signal output and the other of said pairs consisting of said third signal output and said sum signal output; means for applying an Add instruction signal to one of each pair of gating means or a Subtract instruction signal to the other one of each pair of gating means to effect subtraction or addition in each stage of the digits of the corresponding order; and a multi-input AND gate controlled by said comparators to produce an electrical check signal indicating completion and correctness of the result of application of said instruction signal to the selected gating means.

9. An electrical network arrangement for selectively effecting addition or subtraction of multi-order binary numbers comprising a multiplicity of cascaded stages each connected to adjacent stages by carry signal lines, each comprising an add circuit, a subtract circuit, an add-gate, a subtract gate, a comparator, and three registers having 1 and 0 output lines and producing electrical signal outputs respectively representative of the digits B, A, T of the corresponding order, said add circuit having as inputs the 1 signal output of the A and B registers and a carry signal from the preceding stage to produce a carry signal for the following stage, a sum signal for the add-gate and a signal for the comparator in the same stage as the add circuit, said subtract circuit having as inputs the 1 signal output of the T register, the 0 signal output of the B register and a carry signal from the preceding stage to produce a carry signal for the following stage, a difference signal for the subtract-gate and a signal for the comparator in the same stage as the subtract circuit, said comparator also having as inputs the 0 signal outputs of the A and T registers, the add and subtract-gates of all stages also being responsive to electrical signals respectively corresponding with an instruction to add or subtract, said comparators each producing an electrical check signal upon correct execution in the corresponding stage of the instruction given.

10. An electrical network arrangement as in claim 9 additionally including a multi-input AND gate responsive to said check signals to produce an over-all electrical check signal upon correct execution by all stages involved in performance of the instruction given to add or subtract a particular pair of binary numbers.

11. In an electrical digital computer network, a plurality of groups of three registers, one group for each order of the capacity of the computer, said three registers of each group respectively storing an addend-subtrahend signal B, an augend-difference signal A and a minuend-sum signal T, means for supplying an ADD instruction electrical signal or a SUBTRACT instruction electrical signal to said groups, an adder and a subtractor in circuit with each group effective for either instruction to combine electrical signals representing the digital numerical values in two of its registers for indication by the third of its registers and to combine electrical signals representing in complementary sense the digital numerical values stored in said third register with the signal corresponding with the digital numerical value in one of said two registers, an Add gate and a Subtract gate in circuit with each group of registers and selectively responsive to the ADD and SUBTRACT instruction signals to determine which two digital numerical values are combined for indication and which two are complementarily combined for checking purposes, a comparator in circuit with each group for producing an electrical check signal when execution of the instruction has been correctly completed for the digits of the corresponding order, said comparator for an ADD instruction signal comparing input signal A of said ADDER with the difference-output signal of said SUBTRACTOR and for a SUBTRACT instruction signal comparing the input signal T of said SUBTRACTOR with the sum-output signal of said ADDER, and a multi-input gate jointly responsive to the check signals to produce an over-all check signal upon correct execution by the stages involved of the instruction given to all stages.

12. An electrical digital computer network for addition and subtraction of binary numbers comprising a plurality of stages each including means for combining electrical signals representing the digits of the corresponding order and producing electrical signals representing carries for an adjacent order, means for supplying an electrical signal representing an Add or Subtract instruction to said stages, and a plurality of comparators, one for each stage, responsive to sum or difference signals produced by the combining means of that stage and to carry signals produced by an adjacent stage for producing an electrical check signal when execution of the instruction by that stage has been completed and is correct.

13. An electrical digital computer network for addition and subtraction of binary numbers comprising a plurality of stages each including means for combining electrical signals representing the digits of the corresponding order and producing electrical signals representing carries for an adjacent order, means for supplying an electrical signal representing an Add or Subtract instruction to said stages, a plurality of comparators, one for each stage, responsive to sum or difference signals produced by the combining means of that stage and to carry signals produced by an adjacent stage for producing an electrical check signal when execution of the instruction by that stage has been completed and is correct, and a multi-input gate responsive to the check signals of all comparators for producing an over-all electrical check signal upon completion of a correct execution of the instruction by the particular stages involved.

14. A digital computer network as in claim 13 additionally including a delay network to which a Start signal is applied, and an AND gate responsive to the over-all check signal and to the Start signal as delayed by said network.

15. An electrical digital computer network comprising means for respectively producing two coexistent electrical signals respectively representing two numerical quantities, means for logically combining said two signals to produce a third coexistent electrical signal representative of the resultant quantity, and checking means including means for performing the inverse of the function of the aforesaid combining means and effective to combine said third signal with one of said first-named two signals to produce a fourth electrical signal normally matching the other of said first-named two signals.

16. An electrical digital computer network comprising means for respectively producing two coexistent electrical signals respectively representing two numerical quantities, a first combining means upon which said two signals are impressed to produce a third coexistent electrical signal representative of the resultant of the mathematical operation performed by said first combining means, and checking means comprising a second combining means for performing the inverse of said mathematical operation and upon which said third signal and one of said first-named two signals are impressed to produce a fourth electrical signal normally matching the other of said two first-named signals.

References Cited in the file of this patent

UNITED STATES PATENTS

| | | |
|---|---|---|
| 2,370,616 | Bryce | Mar. 6, 1945 |
| 2,789,759 | Tootill et al. | Apr. 23, 1957 |
| 2,861,744 | Schmitt et al. | Nov. 25, 1958 |
| 2,954,926 | Crosman | Oct. 4, 1960 |
| 2,998,191 | Marshall | Aug. 29, 1961 |

UNITED STATES PATENT OFFICE
CERTIFICATE OF CORRECTION

Patent No. 3,058,656 October 16, 1962

James H. Pomerene

It is hereby certified that error appears in the above numbered patent requiring correction and that the said Letters Patent should read as corrected below.

Column 13, line 9, for "diqerence" read -- difference --; column 14, line 19, for "representatively" read -- representative --.

Signed and sealed this 2nd day of April 1963.

(SEAL)
Attest:

ESTON G. JOHNSON
Attesting Officer

DAVID L. LADD
Commissioner of Patents